March 12, 1963 D. T. BOTTORF ET AL 3,081,208
HAZY POLYVINYL FLUORIDE FILM AND PROCESS
Filed Feb. 17, 1960 2 Sheets-Sheet 1

INVENTORS
DONALD THOMAS BOTTORF
JAMES LEE HECHT
VIRGIL EUGENE JAMES

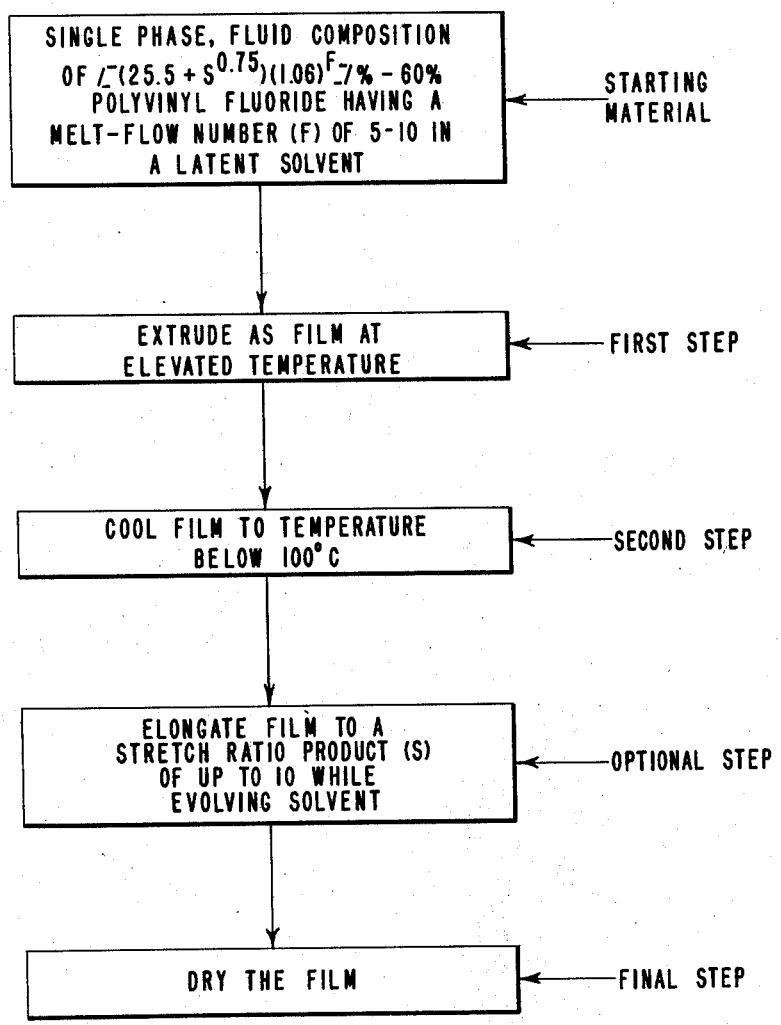

United States Patent Office 3,081,208
Patented Mar. 12, 1963

3,081,208
HAZY POLYVINYL FLUORIDE FILM
AND PROCESS
Donald Thomas Bottorf, Tonawanda, and James Lee Hecht and Virgil Eugene James, Buffalo, N.Y., assignors to E. I. du Pont de Nemours and Company, Wilmington, Del., a corporation of Delaware
Filed Feb. 17, 1960, Ser. No. 15,908
8 Claims. (Cl. 154—46)

This invention relates to the preparation of synthetic organic polymeric films. More particularly, it relates to the preparation of strong, durable films of polyvinyl fluoride having a satin finish.

Strong films having reduced specular reflectance and low transparency, hereinafter called "a satin finish," are in great demand. They are used in laminates, screens, shower curtains and in a host of other decorative and protective uses. However, the most successful prior art processes for forming such films leave much to be desired. The processes heretofore known involve laminating thin metallic or weak hazy polymeric films to a strong polymeric film base or depositing particles or similar additives in or on the base film. In any case, the resulting product suffers from problems due either to poor adhesion to the base film or to the tendency of additives to exude to the surface or to the tendency of particle-coated surfaces to be abraded easily. Furthermore, the elasticity of any resulting laminated or coated or additive-containing film is limited by the surface laminate, the coating or the additive.

It is an object of the present invention to produce a self-supporting polymeric film having a satin finish without using additional materials of any kind. Another object is to produce a novel strong polyvinyl fluoride film having a satin finish. Other objects will appear hereinafter.

The product of the present invention is a polyvinyl fluoride film characterized by a surface exhibiting a reticular structure having insular areas of random size and random shape, the number of insular areas enclosed within the reticular structure ranging from about 5 to about 40 per 0.01 square millimeter of the surface of the film, the reticular structure penetrating the surface of the film to a depth of a few microns, the film being further characterized by a haze level of at least 30% as measured in accordance with ASTM method D1003-52.

In the drawing, FIGURE 1 is a photomicrograph of the novel polyvinyl fluoride film of this invention when viewed with transmitted light where one surface of the film is in sharp focus at a magnification of 186×;

FIGURE 4 is a flow sheet of the process of this invention.

Figure 1:
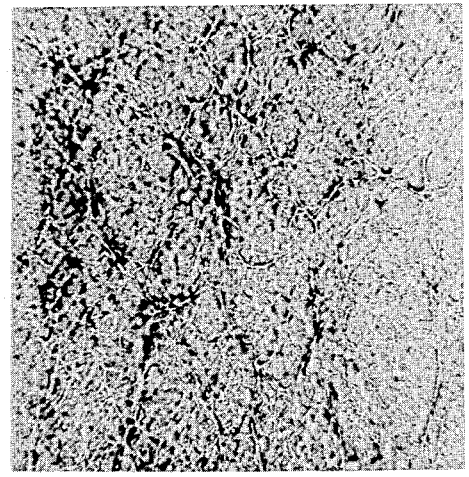

The object, preparing a strong polyvinyl fluoride film having a satin finish, is accomplished by extruding a coalesced, single phase, fluid composition containing between a minimum percentage, P, and about 60% of polyvinyl fluoride in a latent solvent for the polyvinyl fluoride, the polyvinyl fluoride having a melt-flow-number of 5–10, in the form of a film at an elevated temperature sufficient to maintain the fluid composition in a single phase; immediately thereafter, cooling the film to a temperature below about 100° C., preferably below 25° C., and optionally elongating the film in at least one direction, preferably in two mutually perpendicular directions to a stretch ratio product of 3 to 10 while evolving latent solvent therefrom; and then drying the film to remove substantially all of the latent solvent; the minimum percentage, P, used in the fluid composition being determined from the following equation:

$$P = [25.5 + (S)^{0.75}](1.06)_F$$

wherein
F is the melt-flow number of the polyvinyl fluoride, and
S is the stretch ratio product.
If the film is not elongated, the equation reduces to $$P = 26.5(1.06)_F$$

The term "latent solvent" as used herein is defined as an organic liquid, chemically inert with respect to polyvinyl fluoride, and having no significant solvent or swelling action on polyvinyl fluoride at room temperature, but at an elevated temperature below its normal boiling point being capable of solvent action sufficient to cause polyvinyl fluoride particles to coalesce.

The latent solvent should be a liquid at room temperature having a normal boiling point greater than 100° C. It should be thermally stable at least up to the temperatures to which it will be subjected during the process of this invention and preferably up to its normal boiling point. It should not react chemically with either the polymer or the materials of construction of the process equipment over the expected temperature range. The preferred latent solvents for use in the process of this invention are selected from the group consisting of gamma-butyrolactone, N,N-dimethylacetamide, tetramethylene sulfone, dimethylsulfolane, dimethylsulfoxide, N,N-dimethylformamide, N-methyl-2-pyrrolidone and gamma-valerolactone. Other lactams besides N-methyl-2-pyrrolidone and other lactones besides gamma-valerolactone are also useful.

To produce the film of the present invention, it is necessary to employ in the process orientable polyvinyl fluoride of high molecular weight. Films made from polymer ranging in melt-flow number from approximately 5 up to 10 may be used. The melt-flow number of a particular polyvinyl fluoride is the square of the average diameter in inches of a roughly circular film disc resulting from the pressing between two polished chromium-plated steel plates of a 1-inch diameter wafer consisting of 1.00±0.01 gram of said polymer in dried, particulate, compressed form for 5 minutes at 260±1° C. under a total load of 12,250 pounds. Specifically, the procedure involves drying a quantity of particulate polyvinyl fluoride (1.00±0.01 gram) to less than 0.2% water by weight; transferring it to the 1-inch diameter die of a Buehler metallurgical mounting press and pressing the die for a few moments at a load of about 5000 pounds. After releasing the load, removing and disassembling the die, the resulting polymer wafer is an inch in diameter and about 100 mils thick. The polymer wafer is centered between two polished chromium-plated steel plates, 0.020 inch thick and cut to 5 inches by 8 inches with corners and edges smooth. This assembly is then centered between the platens of a Carver laboratory press, the temperature of the surface of the center of each platen being maintained at 260±1° C. The Carver press has 5-inch by 5-inch electrically heated platens and is rated for a load of up to 10 tons. The polymer wafer is then pressed for 5 minutes at this temperature under a load of 12,250 pounds as indicated by the load gauge pointer. As the polymer mass melts and increases in diameter, it is necessary to pump up the press periodically to hold the load constant. At the end of the 5-minute pressing period, the load is immediately released and the plate-polymer-plate assembly is removed from the press and immersed quickly in cool water. After allowing the assembly to remain for several minutes under water, the plates are separated and the film disc removed, dried by blotting and its diameter measured to the nearest 0.01 inch. If the film disc is irregular, eight diameters are measured and averaged arithmetically. The square of this diameter is the melt-flow number of the polymer.

The polyvinyl fluoride-latent solvent, single phase, fluid composition suitable for the purpose of this invention may be prepared by any convenient expedient. In general, a proportioned mixture of particles of high molecular weight, orientable polyvinyl fluoride and latent solvent, the proportions selected in accordance with the previously given equation is heated until the particles coalesce to form the single phase fluid composition. As shown in the equation, the selection of the particular latent solvent/polymer proportions will depend upon the melt-flow number of the polymer and the stretch ratio product of the subsequently obtained film. The minimum percentage of polymer that can be used is about 34%, i.e., where no stretching step is employed (the stretch ratio product is 1), and the polymer has a melt-flow number of 5. As the melt-flow number of the polymer increases, the minimum polymer content that must be used in the feed mixture to produce a satin finish film increases. For example, when a polyvinyl fluoride exhibiting a melt-flow number of about 10 is used and no stretching is provided, the minimum percentage of polymer rises to about 46%.

Stretching the latent solvent-containing polyvinyl fluoride film produced by extrusion and subsequent quenching tends somewhat to reduce the haze level of the film and thus to decrease the satin finish of the film. To compensate for this reduction, the minimum percentage of polymer used in the initial fluid composition must be increased in accordance with the equation as a function of the stretch ratio product. The stretch ratio product is obtained by multiplying the stretch ratio for the first direction of stretch by the stretch ratio for the second and mutually perpendicular direction of stretch. The stretch ratio for either direction is obtained by dividing the stretched length of the film by its original length, the lengths being measured in the direction of stretch. Thus, where no stretch is applied the stretch ratio is unity.

There is no aesthetic objection to films of exceedingly high haze levels. The upper limit on polymer content in the original feed composition is dictated by operability requirements in the process. For example, as the polymer content in the feed mixture increases, the power input requirement for a particular throughput is increased to the point where the work/heat input of the extruder may result in thermal degradation of the polymer. A percentage of about 60% polymer in the feed mixture with the latent solvent is a practical upper limit.

The single phase fluid composition is extruded in the form of a film by conventional means at a temperature sufficient to maintain the fluid composition in a single phase. This temperature may vary anywhere from about 120° C. to about 250° C., at which temperature degradation of the polymer occurs rather rapidly. The more realistic upper limit for this temperature is the temperature above which the latent solvent tends to produce excessive vapor, such boil-off manifesting itself as bubbles and other undesirable defects in the film. When using gamma-butyrolactone as the latent solvent, an extrusion temperature of about 150° C. to about 180° C. is preferably employed. When N,N-dimethylacetamide is used, the extrusion step is preferably carried out in a range of about 140° C.–150° C.

The next step in the process, the step of rapidly cooling or quenching the extrudate from the casting hopper is most easily accomplished by directing the extrudate (the film) into a water bath maintained at the quench temperature. This temperature must be below 100° C. and is preferably below 25° C.

The next step, the stretching step, is preferred in order to obtain a strong durable polyvinyl fluoride film having a satin finish. Although orientable polyvinyl fluoride film containing latent solvent emerging from the quenching step can be successfully stretched either in one direction or in two mutually perpendicular directions at a temperature as low as room temperature, the preferred operating range for the continuous process lies between 30° C. and 185° C. Temperatures in this range are sufficient to maintain adequate friction between the solvent-containing film and the rolls employed to stretch the film longitudinally. Specifically, within this range, it is preferred that the first direction elongation be performed between 30° C. and 120° C., elongation in the second direction mutually perpendicular being preferably performed between 60° C. and 185° C.

Actually, solvent-containing orientable polyvinyl fluoride film may be successfully stretched at temperatures up to that above which it begins to adhere to the surfaces of the process equipment or above which it is no longer sufficiently self-supporting. This will occur in the vicinity of the melting temperature range for the solvent-containing film, which range will vary somewhat with the molecular weight of the polymer but more particularly with the solvent content of the film. However, to minimize the heat input requirements to the process and to reduce the possibility of thermally degrading the polymer, it is desirable to avoid operation at such high temperatures.

The process of this invention may be carried out to elongate a latent solvent-containing polyvinyl fluoride film by stretching or drawing techniques common in the art. It should be understood that, for the purpose of this invention, the terms stretching and drawing are intended to embrace the technique of expanding a tubular polymeric structure by fluid pressure. When film is to be elongated in two mutually perpendicular directions according to the process of this invention, elongation in these two directions may be accomplished either simultaneously or sequentially by techniques well known in the art.

Preferably, the process is carried out by continuously stretching the latent solvent-containing polyvinyl fluoride film sequentially in each of two mutually perpendicular directions. This may be done either by first stretching in a longitudinal direction followed by stretching in the transverse direction, or by reversing the sequence of stretching, since advantages accrue to either sequence.

A major portion, and preferably substantially all of the solvent remaining in the film after elongation, is removed in a final drying operation; for example, subjecting the elongated film in air to a temperature and for a time sufficient to volatilize the major portion of the remaining latent solvent from the film down to a concentration of not more than about 0.2% by weight latent solvent in the film. However, if the temperature of the solvent-free film is allowed to exceed about 180° C., much orientation may be lost if the film is not restrained. With film properly restrained, a stream of air at a temperature in the vicinity of 200° C. may be employed for volatilizing latent solvent from biaxially elongated, oriented film.

The polyvinyl fluoride films produced by the process of this invention scatter and diffuse light to such a degree that they exhibit not only a low level of see-through transparency but also a markedly reduced specular reflectance. To the eye they exhibit a softly textured "satin" finish while yet retaining a smooth flatness to the touch. They exhibit a haze level of at least 30%. The percent haze of film samples is measured in accordance with the standard method of test for haze and luminous transmittance of transparent plastics, ASTM designation: D1003–52. The apparatus employed in carrying out these measurements is a Model AU–10a Complete Pivotable-Sphere Hazemeter with special 4-cell high sensitivity exposure head and automatic photomeric unit, manufactured by Henry A. Gardner, Laboratory, Inc., Bethesda, Maryland. Several determinations of haze level are made for each film sample and the arithmetic average is recorded. In general, samples from a given film vary in haze level less than about 2% from the arithmetic average.

Figure 2:
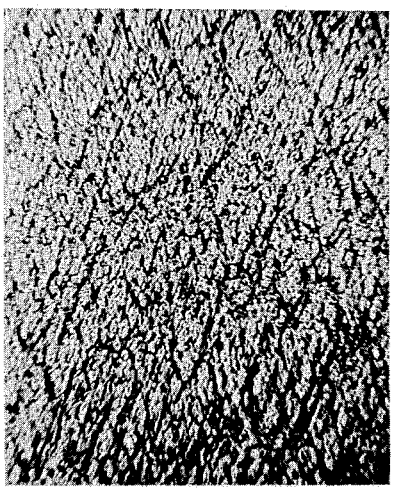
FIGURE 2 is a photomicrograph of the novel film as in FIGURE 1 wherein the magnification is 22×.
Figure 3:
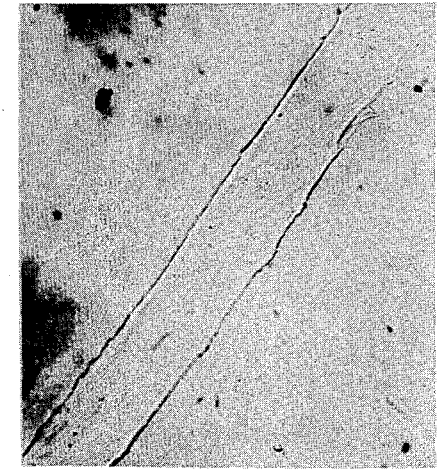
FIGURE 3 is a photomicrograph of the novel polyvinyl fluoride film of this invention viewed with transmitted light when the microscope is focused on an edge of the film at a magnification of 258×. This "profile" view shows that the surface irregularities, as measured from "lows" to "highs," are the order of 1-10 microns.

Microscopic examination of the surfaces of these novel polyvinyl fluoride films, as shown in FIGURES 1–3, reveals a somewhat netlike or recticular pattern. Employing transmitted light at magnifications in the range of 175–200×, where the depth of field is small, it is readily determined that the pattern does not exist throughout the entire thickness of the film but only to a depth of a few microns.

These films may be used in applications where light transmission without transparency is desired, as for example in certain glazing applications, the construction of air-supported structures, room dividers, partitions and movable screens, shower curtains, lamp shades, patio screens and skylighting, etc. They may be laminated to such substrates as aluminum, masonite, cement-asbestos boards, cellulosic hardboards, plywood, etc., said laminations to be employed in exterior house sidings and industrial building sidings such as spandrel panels in curtain wall construction. They may be aluminized by vapor deposition techniques in vacuo and then the aluminized surface laminated to post-formable steels for fabrication into such things as automobile wheel covers and "soft" chrome trim members. A lamination of an aluminized "satin" finish polyvinyl fluoride film to a heavier vinyl film and thence to an automobile hard-top may simulate the effect of brushed stainless steel. These polyvinyl fluoride films may be employed in laminar constructions such as counter and table tops, Venetian blind slats, leatherette type upholstery fabrics, interior wall finishes, automobile seat covers, door paneling and head liners, etc. In the manufacture of fiber-reinforced polymeric resin shaped structures, these novel polyvinyl fluoride films may be employed advantageously as mold release sheets during the curing step, thereby imparting a rich satiny appearance to the finished structure.

The following illustrative examples constitute specific embodiments of the process of this invention and are not intended to be limitative. Example 11 represents the best mode contemplated for carrying out the present invention.

In the examples, tensile strength in lbs./square inch is based upon the initial cross-sectional area of a sample and is determined by elongating the film at a rate of 100% per minute until the sample breaks. The tensile strength is determined in each of the two mutually perpendicular directions of stretch and the average is presented. Percent elongation is the percent increase in length of the film at the breaking point in each direction and an average is presented.

EXAMPLE 1

Gamma-butyrolactone was blended with polyvinyl fluoride having a melt-flow number of 9.8 in a Hobart mixer to form a mixture containing 51% of the polymer and 49% of the solvent. The mixture was fed into an extruder at a rate of 30 lbs./hour where it was heated to a temperature of 155° C. to completely coalesce the polyvinyl fluoride particles and to form a single phase fluid composition with the gamma-butyrolactone.

The composition was extruded through the lips of an 8″-wide hopper, the lips being set at an opening of approximately 33 mils, into a water bath at 23° C. to form a gamma-butyrolactone-containing polyvinyl fluoride film.

The film was passed from the water bath into a stretching apparatus where it was stretched to a stretch ratio product of 4.0. Stretching was accomplished by elongating the film 100%, i.e., 2×, longitudinally over a bank of horizontally mounted, mutually parallel heated idler rolls maintained at about 70° C. followed by stretching the film 100%, i.e., 2×, transversely in a tenter frame at an ambient temperature in the vicinity of 120° C.

Thereafter, the film was dried by subjecting the film while under tension to restrict any dimensional change to a stream of air at a temperature of about 190° C. for about 120 seconds.

The final film was 4.0 mils thick, had a satin finish and displayed a reticular structure in its surface having about 5—40 insular areas per 0.01 square millimeter. When tested for haze level, the film displayed 39% haze. It had an average tensile strength of 12,000 p.s.i. and an average elongation of 140%.

In a control wherein the above described procedure was identical except for the use of only 45% polymer in the feed mixture (whereas the equation requires a minimum of 50%), the final 4.0 mil thick film fell outside the requirements of the present invention. It did not have a satin finish and its haze level was only 15%. Its tensile strength and elongation were substantially the same as the example.

EXAMPLES 2–4

In these examples, gamma-butyrolactone and polyvinyl fluoride were blended as in Example 1 to form compositions containing the percentage of polymer shown in Table I. The melt-flow number of this polymer is also shown in Table I.

Each mixture was fed into an extruder at a rate of 100–120 lbs./hour where it was heated to a temperature of 160° C.–165° C. to form the fluid composition. Each composition was extruded through a 27″-wide hopper, the lips being set at an opening of approximately 20 mils. The composition was extruded into a water bath at 20° C. to form the latent solvent-containing polyvinyyl fluoride film.

The film was stretched and dried in the manner described for Example 1 to the stretch ratio products shown in Table I.

The resulting films all displayed a satin finish; their surfaces showed a reticular structure of between 5–40 insular areas per 0.01 square millimeter and the haze levels were all above 30% as shown in Table I.

*Table I*

| Example | Percent Polymer in Feed | Melt Flow Number | Stretch Ratios | | Stretch Ratio Product | Average Haze Level (percent) | Average Tensile Strength (p.s.i.) | Average Elongation (percent) |
| --- | --- | --- | --- | --- | --- | --- | --- | --- |
| | | | First Direction | Second Direction | | | | |
| 2 | 50 | 7.5–7.8 | 1.9 | 2.7 | 5.13 | 55 | 12,500 | 145 |
| 3 | 50 | 7.3–7.8 | 1.5 | 2.7 | 4.05 | 52 | 12,250 | 135 |
| 4 | 48 | 6.7–7.4 | 1.6 | 2.7 | 4.32 | 47 | 10,350 | 120 |

EXAMPLES 5–10

In these examples, gamma-butyrolactone and polyvinyl fluoride were blended as in Example 1 to form compositions containing the percentage of polymer shown in Table II. The melt-flow number of this polymer was 7.4–7.6. Each mixture was fed into an extruder at a rate of 90–95 lbs./hour where it was heated to a temperature of 170° C.–175° C. to form the fluid composition. Each composition was extruded through a 14″-wide hopper, the lips being set at an opening of approximately 50 mils. The compositions was extruded into a water bath at 15° C. to form the latent solvent-containing polyvinyl fluoride film.

The film was stretched and dried in the manner described for Example 1 to the stretch ratio products shown in Table II.

The resulting films all displayed a satin finish; their surfaces showed a reticular structure of between 5-40 insular areas per 0.01 square millimeter and the haze levels were all above 30% as shown in Table II.

In a control, wherein the above-described procedure was identical except for the use of only 40% polymer in the feed mixture (whereas the equation requires a minimum of 44%), the final film fell outside the requirements of the present invention. It did not have a satin finish and its haze level was only 16%.

Table II

| Example | Percent Polymer in Feed | Stretch Ratios | | Stretch Ratio Product | Average Haze Level (percent) | Average Tensile Strength (p.s.i.) | Average Elongation (percent) |
|---|---|---|---|---|---|---|---|
| | | First Direction | Second Direction | | | | |
| 5 | 50 | 1.55 | 1.95 | 3.02 | 66 | 11,500 | 175 |
| 6 | 45 | 1.8 | 2.4 | 4.32 | 49 | 15,100 | 135 |
| 7 | 50 | 1.7 | 2.1 | 3.57 | 63 | 12,700 | 180 |
| 8 | 47 | 1.7 | 2.35 | 4.0 | 54 | 14,900 | 150 |
| 9 | 50 | 3.0 | 3.3 | 9.9 | 31 | 17,900 | 95 |
| 10 | 48 | 2.5 | 3.2 | 8.0 | 32 | 17,200 | 100 |
| Control | 40 | 1.8 | 2.2 | 3.96 | 16 | 10,450 | 140 |

EXAMPLES 11 AND 12

In these examples, N,N-dimethylacetamide was blended with polyvinyl fluoride having a melt-flow number of 6.7-6.9 to form compositions containing the percentages of the polymer shown in Table III.

Each mixture was fed into an extruder at a rate of 100-120 lbs./hour where it was heated to a temperature of 146° C.-148° C. to form the fluid composition. Each composition was extruded through a 27"-wide hopper, the lips being set at an opening of approximately 20 mils. The composition was extruded into a water bath at 15° C. to form the latent solvent-containing polyvinyl fluoride film.

The film was stretched and dried in the manner described for Example 1 to the stretch ratio products shown in Table III.

The resulting films all displayed a satin finish; their surfaces showed a reticular structure of between 5-40 insular areas per 0.01 square millimeter and the haze levels were all above 30% as shown in Table III.

Table III

| Example | Percent Polymer in Feed | Stretch Ratios | | Stretch Ratio Product | Average Haze Level (percent) | Average Tensile Strength (p.s.i.) | Average Elongation (percent) |
|---|---|---|---|---|---|---|---|
| | | First Direction | Second Direction | | | | |
| 11 | 50 | 1.85 | 2.7 | 5.0 | 60 | 12,750 | 155 |
| 12 | 48 | 1.55 | 2.6 | 4.03 | 60 | 12,750 | 155 |

Having fully disclosed the invention, what is claimed is:

1. A strong, durable, oriented polyvinyl fluoride film having a smooth surface characterized by a reticular structure, said reticular structure having insular areas of random size and random shape, the number of insular areas in said reticular structure ranging from about 5 to about 40 per 0.01 square millimeter, said film being further characterized by a haze level of at least 30%.

2. A process comprising the steps, in sequence, of extruding a coalesced, single phase, fluid composition containing polyvinyl fluoride and a latent solvent for said polyivnyl fluoride in the form of a film at an elevated temperature sufficient to maintain the fluid composition in a single phase, said polyvinyl fluoride having a melt-flow number of 5-10 and comprising at least a minimum percentage, P, of said fluid composition; cooling said film to a temperature below 100° C.; elongating said film in at least one direction to a stretch ratio product of 3 to 10 while evolving solvent therefrom; and drying said film; the minimum percentage, P, being determined from the equation:

$$P = [25.5 + (S)^{0.75}](1.06)^F$$

wherein F is the melt-flow number of said polyvinyl fluoride, and S is the stretch ratio product.

3. A process comprising the steps, in sequence, of extruding a coalesced, single phase, fluid composition containing polyvinyl fluoride and a latent solvent for said polyvinyl fluoride in the form of a film at an elevated temperature sufficient to maintain the fluid composition in a single phase, said polyvinyl fluoride having a melt-flow number of 5-10 and comprising at least a minimum percentage, P, of said fluid composition; cooling said film to a temperature below 100° C.; stretching said film in two mutually perpendicular directions to a stretch ratio product of 3-10 while evolving solvent therefrom; and drying said film; the minimum percentage, P, being determined from the equation:

$$P = [25.5 + (S)^{0.75}](1.06)^F$$

wherein F is the melt-flow number of said polyvinyl fluoride, and S is the stretch ratio product.

4. A process comprising the steps, in sequence, of extruding a coalesced, single phase, fluid composition containing polyvinyl fluoride and a latent solvent for said polyvinyl fluoride in the form of a film at an elevated temperature sufficient to maintain the fluid composition in a single phase, said polyvinyl fluoride having a melt-flow number of 5-10 and comprising from at least a minimum percentage, P, to about 60 percent of said fluid composition; cooling said film to a temperature below 100° C.; and drying said film; the minimum percentage, P, being determined from the equation:

$$P = (26.5)(1.06)^F$$

wherein F is the melt-flow number of said polyvinyl fluoride.

5. A process comprising the steps, in sequence, of extruding a coalesced, single phase, fluid composition containing polyvinyl fluoride and a latent solvent for said polyvinyl fluoride in the form of a film at an elevated temperature sufficient to maintain the fluid composition in a single phase, said polyvinyl fluoride having a melt-flow number of 5-10 and comprising from at least a minimum percentage, P, to about 60 percent of said fluid composition; cooling said film to a temperature below 100° C.; elongating said film in at least one direction to a stretch ratio product of up to 10 while evolving solvent therefrom; and drying said film; the minimum percentage, P, being determined from the equation:

$$P=[25.5+(S)^{0.75}](1.06)^F$$

wherein F is the melt-flow number of said polyvinyl fluoride, and S is the stretch ratio product.

6. A process comprising the steps, in sequence, of extruding a coalesced, single phase, fluid composition containing polyvinyl fluoride and gamma-butyrolactone in the form of a film at a temperature of about 150–180° C., said polyvinyl fluoride having a melt-flow number of 5–10 and comprising from at least a minimum percentage, P, to about 60 percent of said fluid composition; cooling said film to a temperature below about 100° C.; stretching said film in at least one direction to a stretch ratio product of up to 10 while evolving gamma-butyrolactone therefrom; and drying said film; the minimum percentage, P, being determined from the equation:

$$P=[25.5+(S)^{0.75}](1.06)^F$$

wherein F is the melt-flow number of said polyvinyl fluoride, and S is the stretch ratio product.

7. A process comprising the steps, in sequence, of extruding a coalesced, single phase, fluid composition containing polyvinyl fluoride and N,N-dimethylacetamide in the form of a film at a temperature of about 140–150° C., said polyvinyl fluoride having a melt-flow number of 5–10 and comprising from at least a minimum percentage, P, to about 60 percent of said fluid composition; cooling said film to a temperature below about 100° C.; stretching said film in at least one direction to a stretch ratio product of up to 10 while evolving N,N-dimethylacetamide therefrom; and drying said film; the minimum percentage, P, being determined from the equation:

$$P=[25.5+(S)^{0.75}](1.06)^F$$

wherein F is the melt-flow number of said polyvinyl fluoride, and S is the stretch ratio product.

8. A process comprising the steps, in sequence, of extruding a coalesced, single phase, fluid composition containing polyvinyl fluoride and a latent solvent for said polyvinyl fluoride in the form of a film at an elevated temperature sufficint to maintain the fluid composition in a single phase, said polyvinyl fluoride having a melt-flow number of 5–10 and comprising at least a minimum percentage, P, of said fluid composition; cooling said film to a temperature below 25° C.; elongating said film in at least one direction to a stretch ratio product of up to 10 while evolving solvent therefrom; and drying said film; the minimum percentage, P, being determined from the equation:

$$P=[25.5+(S)^{0.75}](1.06)^F$$

wherein F is the melt-flow number of said polyvinyl fluoride, and S is the stretch ratio product.

References Cited in the file of this patent

UNITED STATES PATENTS

| | | |
|---|---|---|
| 2,417,293 | D'Alelio | Mar. 11, 1947 |
| 2,721,114 | Downing et al. | Oct. 18, 1955 |
| 2,748,042 | Borgese | May 29, 1956 |
| 2,791,000 | Bechtold | May 7, 1957 |
| 2,822,237 | Dwamae | Feb. 4, 1958 |
| 2,824,780 | Sutterthwaite | Feb. 25, 1958 |
| 2,914,436 | Nakielny | Nov. 24, 1959 |
| 2,953,818 | Barton | Sept. 27, 1960 |